United States Patent
Kalla et al.

(12) 
(10) Patent No.: US 6,213,103 B1
(45) Date of Patent: Apr. 10, 2001

(54) FUEL PREHEATER FOR A PISTON INTERNAL COMBUSTION ENGINE WITH HEAT VAPORIZATION OF THE FUEL

(76) Inventors: Markus Kalla, Swederstrasse 6, D-49143 Bissendorf (DE); Josef Kalla, Steggelenweg 10, D-79761 Waldshut-Tiengen (DE)

( * ) Notice: Subject to any disclaimer, the term of this patent is extended or adjusted under 35 U.S.C. 154(b) by 0 days.

(21) Appl. No.: 09/269,660

(22) PCT Filed: Aug. 4, 1998

(86) PCT No.: PCT/DE98/02252
§ 371 Date: Jun. 18, 1999
§ 102(e) Date: Jun. 18, 1999

(87) PCT Pub. No.: WO99/07992
PCT Pub. Date: Feb. 18, 1999

(30) Foreign Application Priority Data

Aug. 5, 1997 (DE) .............................................. 197 33 803

(51) Int. Cl.[7] .................................................. F02M 53/06
(52) U.S. Cl. ...................................... 123/549; 123/179.21
(58) Field of Search .................................. 123/549, 557, 123/179.21

(56) References Cited

U.S. PATENT DOCUMENTS

| 3,868,939 | | 3/1975 | Friese et al. . | |
|---|---|---|---|---|
| 4,458,655 | * | 7/1984 | Oza ...................................... | 123/557 |
| 4,572,146 | * | 2/1986 | Grunwald et al. .................... | 123/549 |
| 5,050,569 | * | 9/1991 | Beunk et al. ......................... | 123/549 |
| 5,054,458 | * | 10/1991 | Wechem et al. ..................... | 123/549 |
| 5,130,517 | * | 7/1992 | Schmid et al. ....................... | 123/549 |
| 5,218,943 | * | 6/1993 | Takeda et al. ....................... | 123/549 |

FOREIGN PATENT DOCUMENTS

| 2646069 | 4/1978 | (DE) . |
|---|---|---|
| 3017591 | 11/1981 | (DE) . |
| 19500184 | 7/1996 | (DE) . |
| 2174504 | 10/1973 | (FR) . |
| 01257758 | 10/1989 | (JP) . |

* cited by examiner

Primary Examiner—Marguerite McMahon
(74) Attorney, Agent, or Firm—Tarolli, Sundheim, Covell, Tummino & Szabo L.L.P.

(57) ABSTRACT

The invention seeks to improve the functioning of a piston internal combustion engine which uses heat vaporization of the fuel, already in the starting and cold running phase. This is achieved by using a fuel preheater having at least one glow plug fitted directly in the nozzle-holder shank. The glow plug protrudes into the modified fuel chamber of the valve body, and is in direct contact with the fuel. In this way, the fuel is instantaneously heated to a temperature far above boiling point at atmospheric pressure. As a result, the combustion process of the internal combustion engine is considerably more efficient in the starting and cold running phase. In addition, fuel consumption is lower and cleaner exhaust gases are given off.

1 Claim, No Drawings

FUEL PREHEATER FOR A PISTON INTERNAL COMBUSTION ENGINE WITH HEAT VAPORIZATION OF THE FUEL

The invention relates to a device for fuel preheating in the starting and cold running phase of an internal combustion engine with direct fuel injection and hot fuel evaporation comprising at least one injection nozzle with extended nozzle holder shank and a built-in pressure independently controlled valve as well as at least one glow plug operated in any manner.

German Patent DE 195 00 184 C2 discloses an internal combustion engine with direct fuel injection and hot fuel evaporation. Guiding the injection nozzle shank through the outlet channel and using a fuel pump with constant pressure in conjunction with pressure independently controlled valves created the conditions for converting the fuel into the state of a fuel vapor immediately prior to the combustion process and thus obtaining significantly more efficient combustion. The consequences, among others, are a significant performance increase of the internal combustion engine, reduced consumption and reduced exhaust gas values.

This system, however, functions perfectly only at a corresponding operating temperature. During the starting or cold running phase, the nozzle holder shank is not yet adequately heated so that the fuel contained therein cannot be heated or converted into fuel vapor as it passes into the combustion chamber. The fuel is merely sprayed, which results in significantly poorer combustion conditions. The machine runs erratically, consumes more fuel, and emits more pollutants.

DE 26 46 069 A1 also discloses a device for preheating the fuel in the valve body/nozzle holder shank of the injection valve. In this case, preheating is accomplished by an electrically heatable resistance wire coil arranged in a closed insulating sheath around the valve body/nozzle holder shank of the injection valve.

Such an arrangement is not applicable in practice, however, because the fuel inside the valve body (fuel chamber) is heated only gradually since the heat must first pass through the insulator and, in particular, the nozzle holder shank wall. Furthermore, the use of a pressure dependent valve in this system excludes heating the fuel to a temperature above the boiling temperature at atmospheric pressure.

To solve this technical problem, the invention proposes a device that brings the fuel within the nozzle holder shank to a temperature far exceeding the boiling temperature at atmospheric pressure before the combustion heat of the internal combustion engine is available for this purpose.

This is essentially accomplished by installing a glow plug in the nozzle holder shank such that it projects all the way into the interior (i.e. into the correspondingly modified fuel chamber of the valve body) and thus is in direct contact with the fuel. This measure makes it possible to bring the fuel contained in the nozzle holder shank very rapidly to the required temperature.

Thus, even in the starting or cold running phase, a nearly optimal fuel distribution is achieved, which significantly increases the efficiency of the combustion process and thus of the entire internal combustion engine. The resulting environmental advantages (low fuel consumption, clean exhaust gases) are apt ultimately to play a decisive role in this invention.

What is claimed is:

1. A device for fuel preheating in the starting and cold running phase of an internal combustion engine having direct fuel injection and hot fuel evaporation comprising at least one injection nozzle with extended nozzle holder shank and a built-in and pressure independently controlled valve, as well as at least one glow plug operated in any manner, which is built into the nozzle holder shank, the injection nozzle being connected to a fuel pump with constant pressure; characterized in that the valve has a valve body including a modified fuel chamber, that the glow plug projects all the way into the modified fuel chamber of the valve body and is in direct contact with the fuel and that the fuel contained therein is heated in the starting and cold running phase to a temperature far exceeding the boiling temperature at atmospheric pressure.

* * * * *